Figure 1:
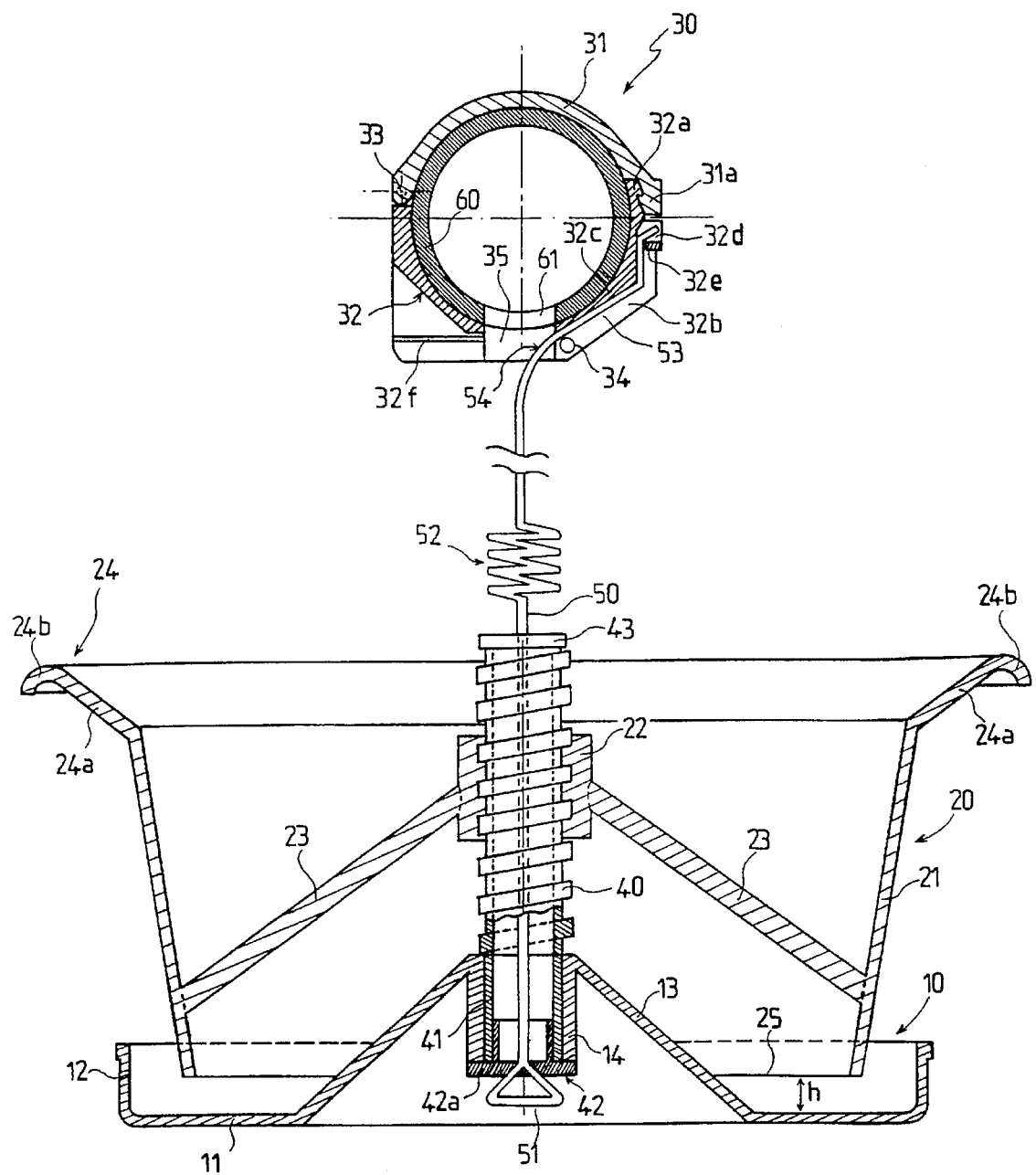

United States Patent [19]

Bannier et al.

[11] Patent Number: 5,642,688
[45] Date of Patent: Jul. 1, 1997

[54] APPARATUS FOR FEEDING ANIMALS SUCH AS FOWL

[76] Inventors: Anita Bannier, 1, rue Paul Le Flem—F—35200; Bruno Le Roy; Nicolas Le Roy, both of 48, rue Monsieur Vincent—F—35200, all of Rennes, France

[21] Appl. No.: 354,210

[22] Filed: Dec. 12, 1994

[30] Foreign Application Priority Data

Dec. 17, 1993 [FR] France ................................ 93 15529
Jul. 22, 1994 [FR] France ................................ 94 09385

[51] Int. Cl.⁶ .............................................. A01K 39/012
[52] U.S. Cl. ........................................ 119/53; 119/57.4
[58] Field of Search ............................... 119/51.11, 53, 119/57.4

[56] References Cited

U.S. PATENT DOCUMENTS

| | | | |
|---|---|---|---|
| 3,971,340 | 7/1976 | Allen | 119/53 X |
| 4,348,988 | 9/1982 | Lawson | 119/53 |
| 5,092,274 | 3/1992 | Cole et al. | 119/53 X |
| 5,101,766 | 4/1992 | Runion | 119/53 |

FOREIGN PATENT DOCUMENTS

| | | |
|---|---|---|
| 2520192 | 7/1983 | France . |
| 8202320 | 7/1982 | WIPO . |

OTHER PUBLICATIONS

French Search Report

*Primary Examiner*—Robert P. Swiatek
*Attorney, Agent, or Firm*—Laff, Whitesel, Conte & Saret, Ltd.

[57] ABSTRACT

A feeding device for animals, such as poultry, is of a type which is designed to be supplied with feed by a conveyor tube (60) from which it is suspended. The device comprises a plate (10, 110) and a receptacle (20, 120). The inside area of the receptacle can, if desired, be in communication with the inside of the plate (10, 110). The conveyor tube (60) communicates with the inside area of the receptacle (20, 120). The level of feed in the plate (10, 110) can be adjusted when it is in communication with the inside area of the receptacle (20, 120), the plate (10, 110) functions as a trough.

20 Claims, 7 Drawing Sheets

APPARATUS FOR FEEDING ANIMALS SUCH AS FOWL

The present invention concerns a feeding device for animals, such as poultry. A device according to the invention is of the type which supplies feed by a conveyor tube under which it is suspended and in which the animals come to feed.

The conveyor tubes in question in the invention are usually called "ground conveyors". In effect, being horizontally suspended from the frames of buildings by means of cables and pulleys, these conveyors can be raised or lowered as required.

Feeding devices for animals are already known. Usually, these devices are designed to be supplied by feed conveying installations and, depending on the type, are intended for conveyors called "overhead conveyors" or conveyors called "ground conveyors".

The feed distribution method by "overhead conveyors" concerns conveyor tubes attached to the framework which facilitates, in particular, placing partitions at ground level, required for separating the poultry lots during the first days.

Thus, patent No. FR-A-2 520 192 describes a device which is a trough supplied with feed by an "overhead conveyor" which conveys the feed into the troughs via long, cumbersome downward ducts which must be dismantled on the departure of the poultry.

The use of "ground conveyors" does not have this disadvantage and only requires slight slopes which, at one end, are hooked onto the "ground conveyors" and which, at the other end, directly supply the feeding devices in order to accommodate their vertical displacements.

One of the objects of the invention is to provide a device for feeding animals which is suspended from a conveyor tube of the "ground conveyor" type.

The animals, whether they are young poultry, such as chicks or young turkeys or whether they are adult poultry, such as chickens or turkey hens or turkey cocks, do not all feed in the same way and, in particular, at the same height. When young poultry peck in a plate situated on the ground, turkey hens and turkey cocks feed in a trough which is raised vis-à-vis the ground.

Poultry breeders, to improve their breeding, alternate the animal batches which they keep: for several successive batches, they raise chicken, then, for one or two batches, they raise turkeys. Disease germs which might have originated during the first batches, are thus eliminated during the following batches of different animals.

For the breeder, the method of alternating animals nevertheless poses a problem due to the installation which is not necessarily the same for all of the animals and, in particular, the feeding devices which, taking into account the different feeding methods mentioned above, do not have the same structure.

Generally and conventionally, when there is a change in animals, the breeder dismantles the troughs provided for the batches of the first type of animal and installs, in its place, troughs designed for the second type. This operation has proven to be long and tedious.

Thus, there is a need for a poultry feeding device which can, from a structural point of view, be used for all types of poultry.

It is therefore an object of the invention to propose a feeding device whose structure is such that it can be used both for animals who peck in a ground plate and for animals, such as turkey hens or turkey cocks, who feed in a trough which is raised vis-à-vis the ground.

This object is solved with a feeding device for animals, such as poultry, of the type which is designed to be supplied with feed by a conveyor tube from which it is suspended. It comprises, moreover, a plate, a receptacle the inside of which can, if desired, be connected with the inside of said plate, means for connecting said conveyor tube with the inside of said receptacle and means for controlling the feed level in said plate when it is connected with the inside of said receptacle, said plate thus functioning in the manner of a trough.

Thus, when the receptacle is open on the plate, it deposits the feed which it contains and which has been supplied to it by the conveyor tube into the plate, and the animals can come to feed in the plate. In this embodiment, the feeding device of the invention is adapted for chicks who feed close to the ground. When the hopper has a base which is obstructed, it plays the role of a trough and is thus adapted to poultry which feed at a raised level, such as turkey hens or turkey cocks.

According to a particularly advantageous embodiment, the control means for the feed level in said plate consists of at least one window in the base of the receptacle which can be, if desired, open on the plate base or obstructed by said base, said plate and said receptable being able to slide axially in relation to one another in such a way so as to be able to assume all the positions which are between an open position and a closed position, the inside of the receptable being connected with the inside of the plate in all of the positions, with the exception of the closed position.

According to another important feature of the invention, a feeding device comprises, in addition, means for controlling the feed level in said receptacle, said receptacle then functioning in the manner of a trough.

Advantageously, said control means consist, on the one hand, of a central deep part which is equipped with a base and the upper opening of which is connected with said feed tube, the lateral wall of said central part being pierced by at least one opening leading to the inside of said receptacle and, on the other hand, of a control element in the form of a sleeve which comes to cover, with play, the central part of the receptacle, said control element being adjustable in height with respect to the base of the receptacle.

According to another feature of the invention, it is suspended from the conveyor tube by means of a flexible, pliable element.

According to another feature of the invention, the upper opening of the central part is connected to the conveyor tube by means of a flexible and pliable tube.

According to another feature of the invention, said pliable tube has an upper end which is mounted on a deep support which comes to encircle the conveying tube and which is open in its lower part, said support consisting of two half shells which can pivot relative to one another along an axis which is almost parallel to the axis of the conveyor tube, said pliable tube being fitted into a part formed by said half shells and situated under said pivot axis.

According to another feature, a device according to the invention is suspended from the conveyor tube by a flexible, vertical suspension element which is hooked, by its upper end, onto said conveyor tube and which is fastened, by its lower end, to said plate or said receptacle.

According to another feature of the invention, said flexible suspension element comprises a spiral part.

According to another feature of the invention, said suspension element passes into a tube, the lower end of which is fastened in the base of said plate and the upper part of which is connected to the wall of the receptacle.

According to another feature of the invention, said tube is threaded, the receptacle comprising in its axis a screw which is connected to the wall of the receptacle and which is designed to screw onto said threaded part in order to be able to axially displace said receptacle vis-à-vis said plate.

According to another feature of the invention, it comprises a support fastened to the conveyor tube to which the suspension element is connected, the upper part of said suspension element being bent so as to be inclined in relation to the vertical and resting, on the one hand, on a first surface of said support inside said elbow and, on the other hand, on a second surface of said support at its end beyond said elbow and outer side of said elbow.

According to another feature of the invention, the end of said suspension element comprises a hooked part which is intended to lodge in a housing of said support.

According to another feature of the invention, it is provided with a conical cap.

According to another feature of the invention, the plate and the receptacle are such that the wall of the receptacle is sufficiently close to the periphery of the plate that it constitutes an obstacle which prevents a chick from staying in the plate and contaminating the feed.

According to another feature of the invention, the upper edge of the receptacle is made so as to receive an extension, the lateral wall of which extends the wall of the receptacle.

According to another feature of the invention, it comprises a reinforcement, the outside ring of which is attached to the upper edge of the receptacle, said reinforcement comprising, moreover, an inside ring connected to the outside ring by couplings and designed to transmit to the lower part of the pliable element the forces of the animals pushing against the edges of the receptacle.

According to another feature of the invention, means are provided to immobilize the plate vis-à-vis the receptacle.

According to another feature of the invention, said immobilization means consist of at least one flap, the pin of which can penetrate into the holes placed in a common wall of the receptacle.

Figure 2:
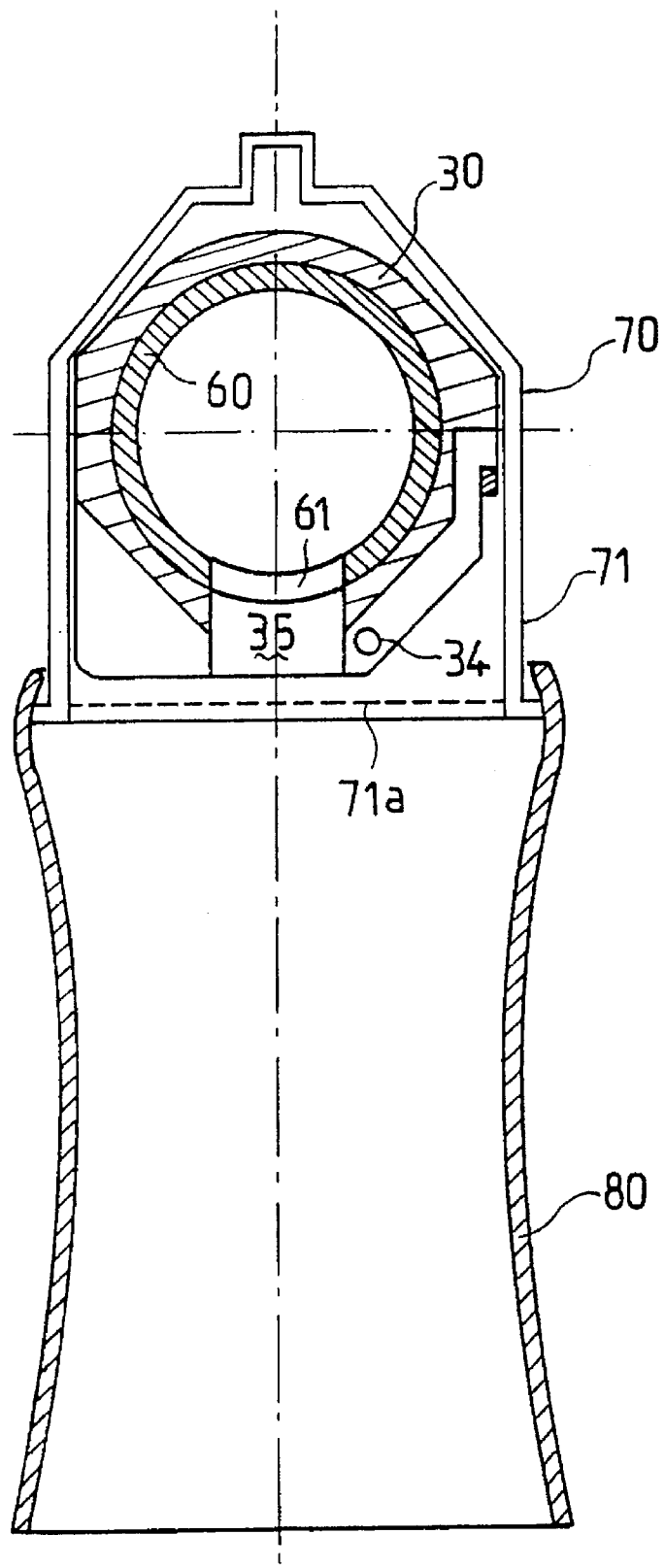
Figure 3:
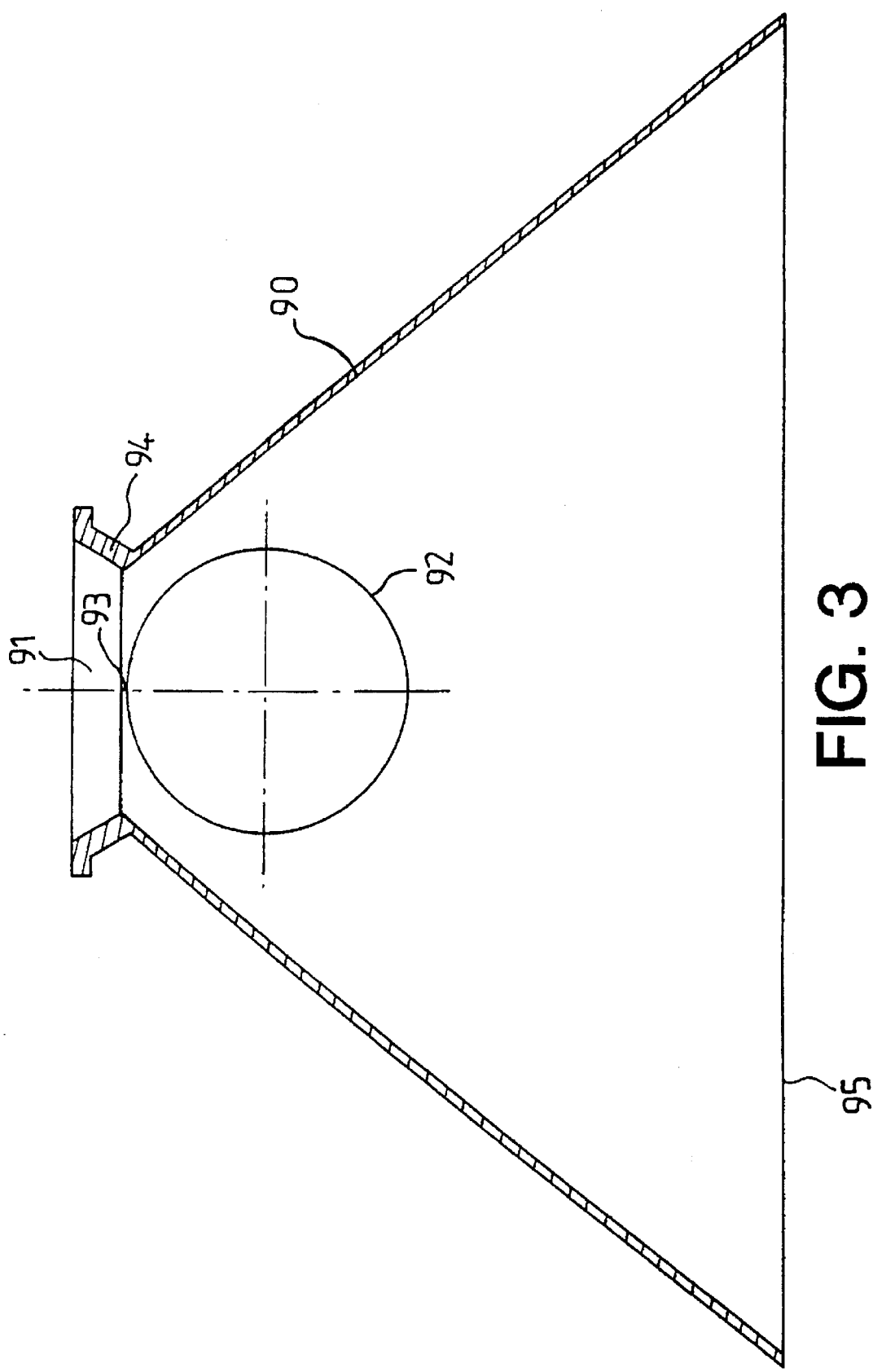
Figure 4A:
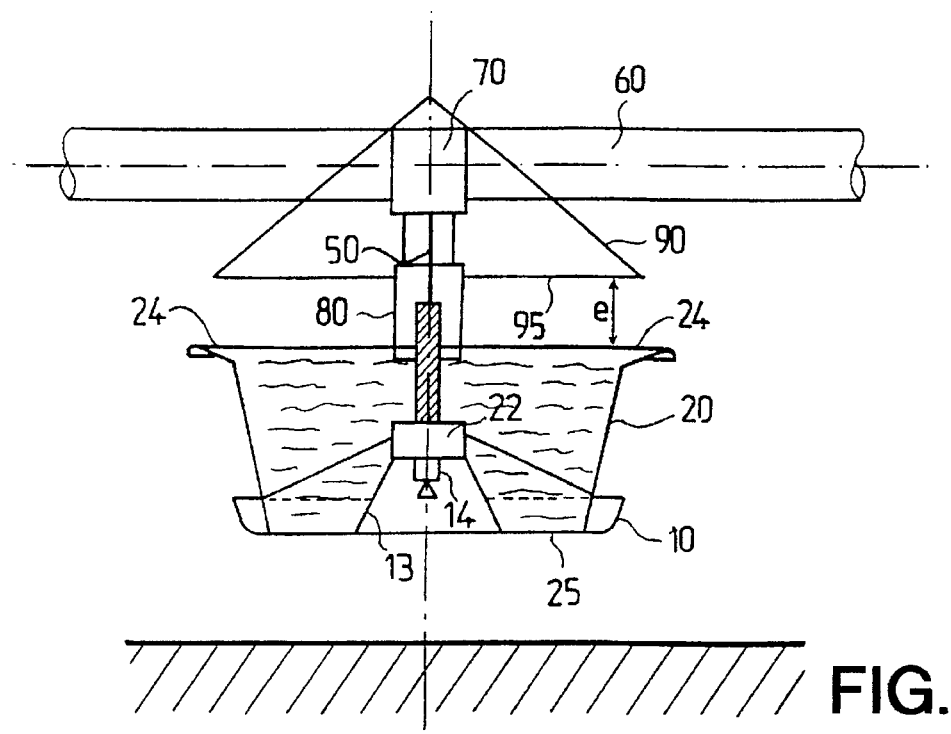
Figure 4B:
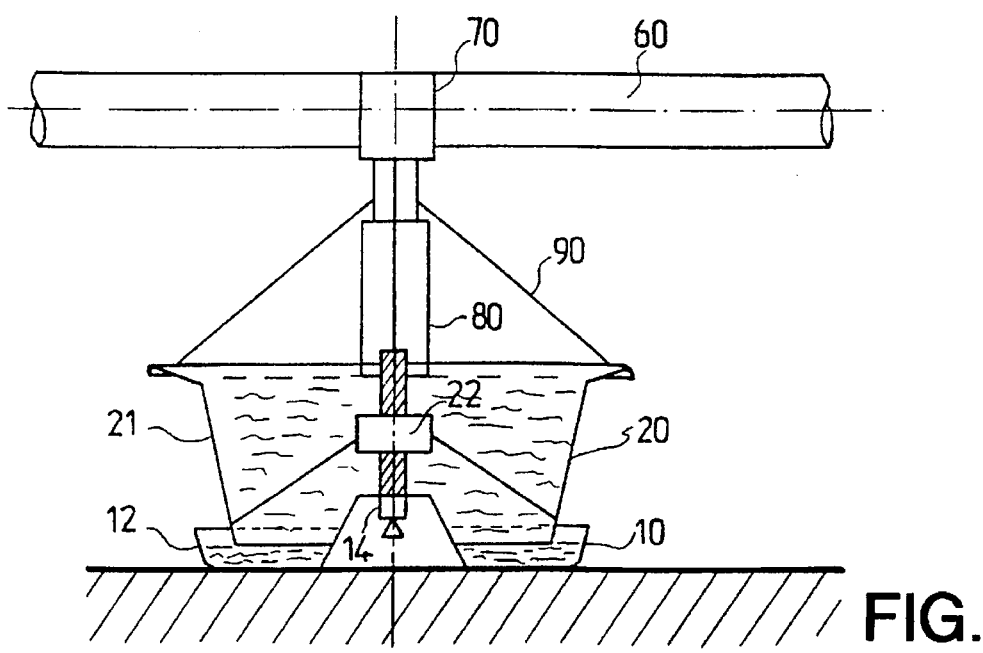
Figure 5:
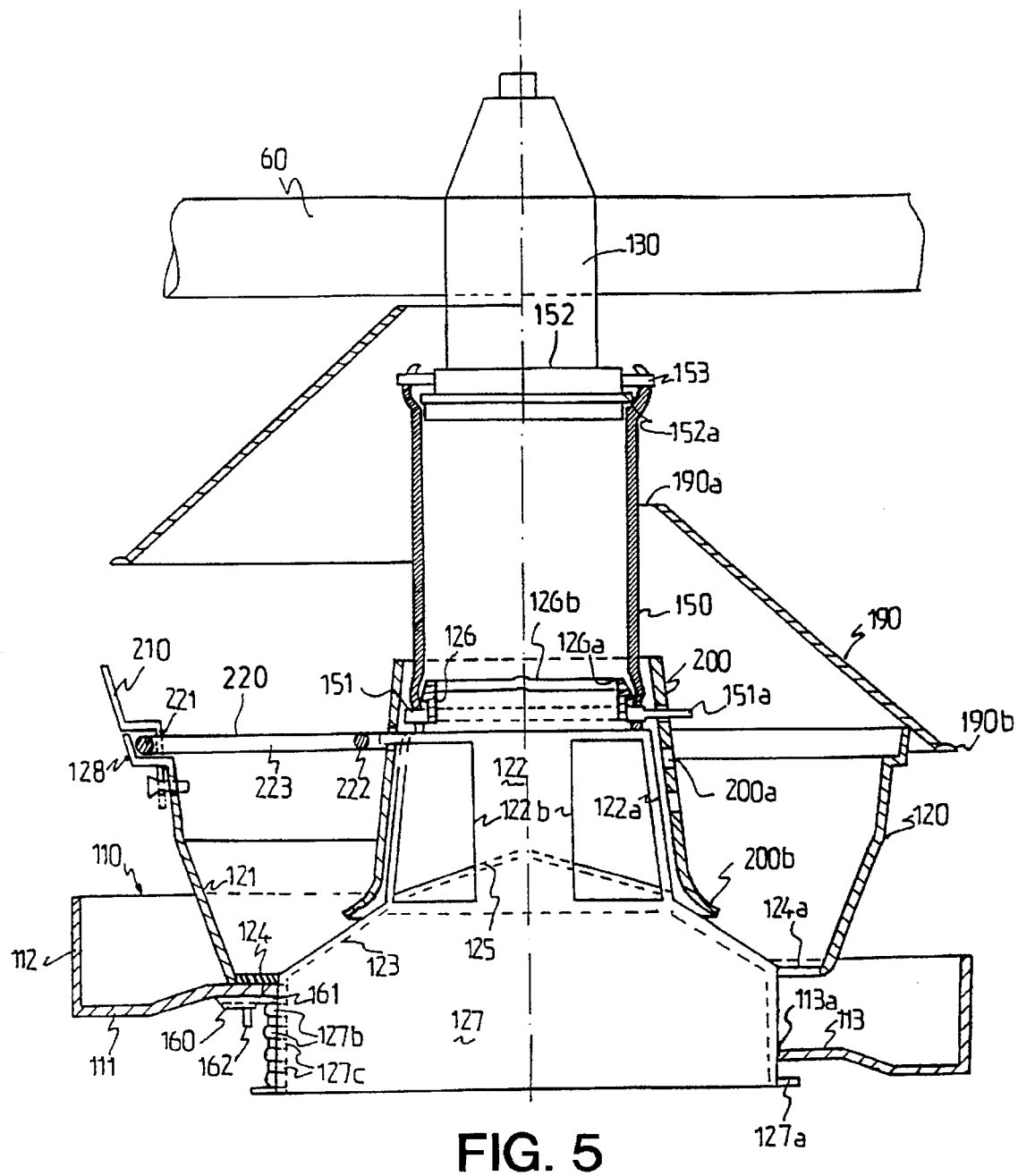
Figure 6:
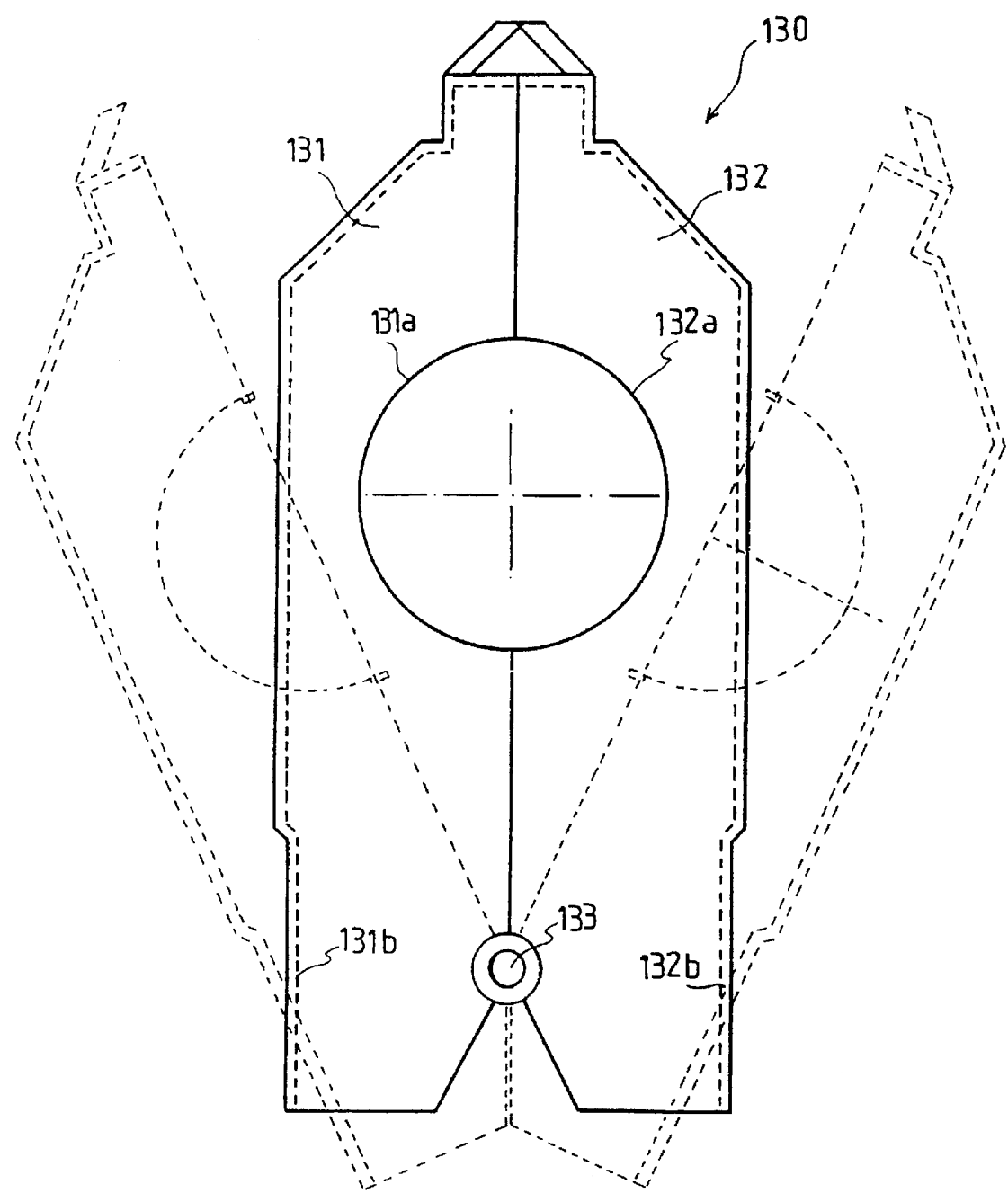
Figure 7A:
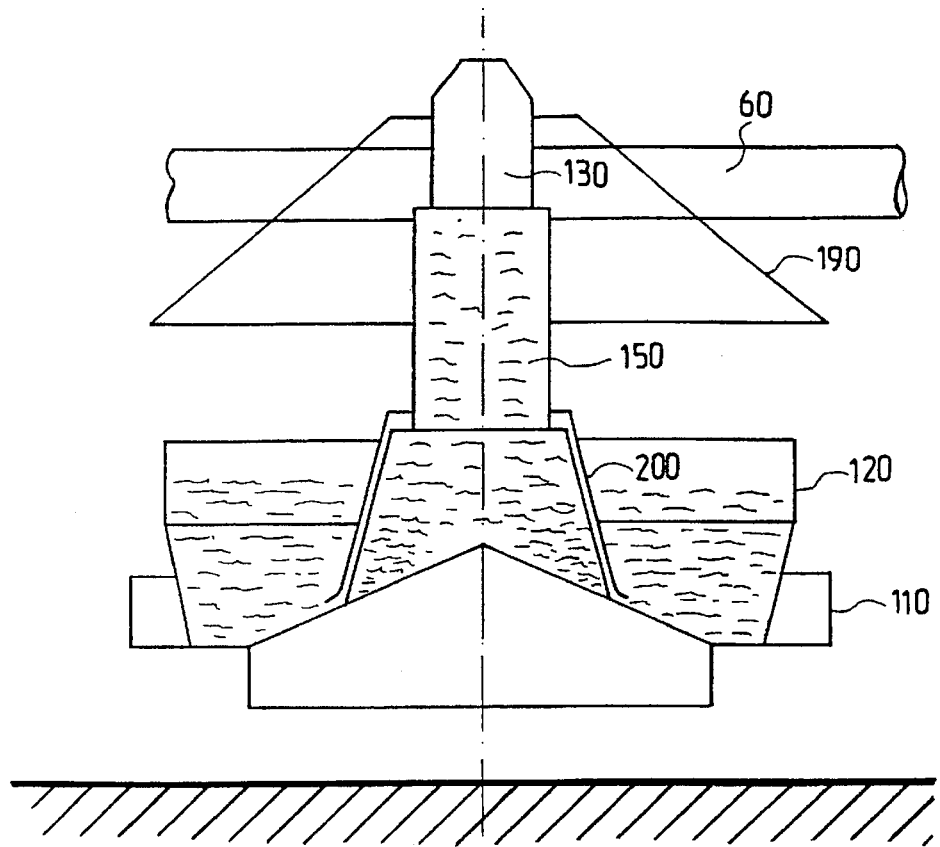
Figure 7B:
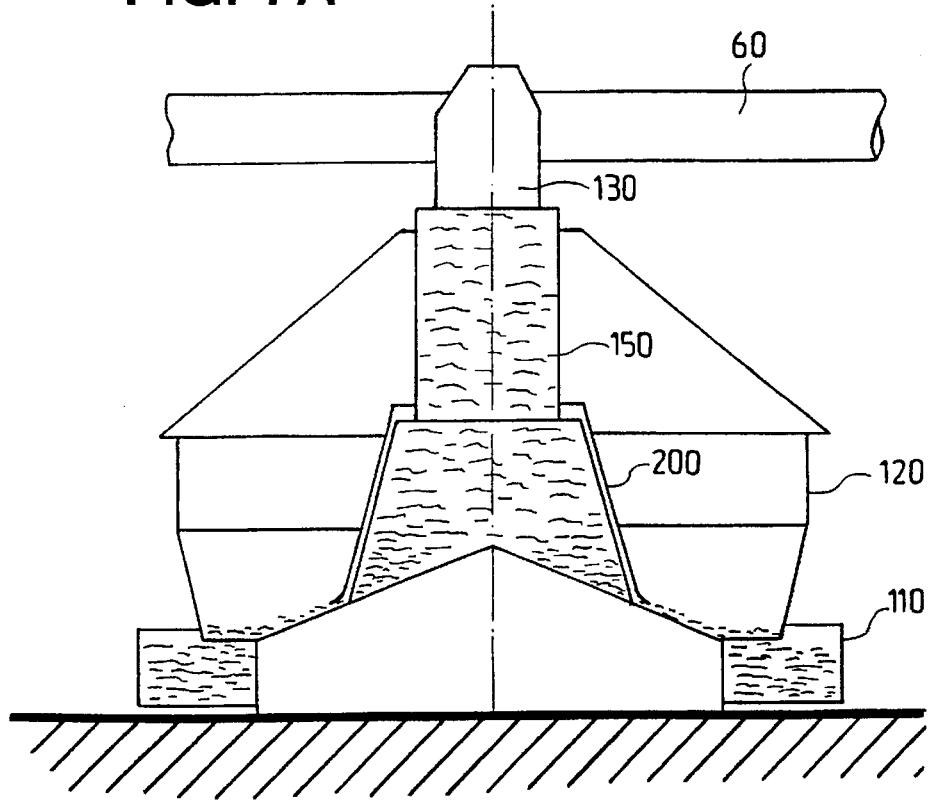

The aforementioned features of the invention, as well as others, will become clearer from the following description of an embodiment, said description being made with reference to the attached drawings, showing:

FIG. 1 is a sectional view of a feeding device according to a first embodiment of the invention, FIG. 2 is a sectional view of the support of a feeding device according to the first embodiment of the invention, which connects it to the conveyor tube, FIG. 3 is a sectional view of a cap of a feeding device according to the invention, FIGS. 4a and 4b are diagrams which show two modes of application of a feeding device according to the first embodiment of the invention, FIG. 5 is a sectional view along a median plane of a second embodiment of the invention, FIG. 6 is a plan view of a support of the feeding device according to the second embodiment of the invention, and FIGS. 7a and 7b are diagrams similar to the diagrams of FIGS. 4a and 4b for a feeding device according to the second embodiment of the invention.

The poultry feeding device shown in FIG. 1 essentially consists of a plate 10, a receptacle 20 and a support 30.

The plate 10 has a generally circular shape with a flat base 11 and a periphery 12 which is raised. In its centre, it comprises a conical part 13, the top of which is provided with a tube 14 which is housed inside the space created by the conical part 13.

In this first embodiment of the invention, the receptacle 20 is made up of a hopper which has a slightly sloping, generally truncated cone shape and widens toward the top. The receptacle 20 is higher than the plate 10.

According to an important feature of the invention, the hopper 20 has a base 25 which is open onto the plate 10. Its inside forms a reserve for the feed which has been deposited by the conveyor tube 60 and which is used to supply the plate 10.

The hopper 20 is provided, in its axis, with a screw 22 which is connected to wall 21 by means of almost radial arms 23. The upper edge of the hopper 20 is provided with a flare toward the top 24a, extended toward the outside by a flange 24b having a semi-circular section.

The flange 24b permits the feed which drops from the beak of the poultry to be returned to the hopper 20 and the flange 24b makes the upper edge of the hopper 20 smoother for the poultry.

A tube or screw 40 is threaded over its entire length, with the exception of an end part 41 which is designed so as to be fitted into the tube 14 of the plate 10. The part 41 is immobilized in the tube 14 and, to accomplish this, it is either a squared section fitted into the tube 14 of the square section, or threaded and screwed into the tube 14 whose hole is threaded on the inside, or consists of any other similar means. The screw 40 is hollow over its entire length. A plug 42 is fitted inside the hollow part 41 of the screw 40. The plug 42 comprises an end wall 42a which forms a flange which comes to abut against the lower edge of the tube 14.

The screw 40 is screwed onto the nut 22 of the hopper 20. Thus, a rotation of the hopper 20 vis-à-vis the screw 40 carries the hopper 20 along by axial translation in relation to the plate 10. To make this rotation possible, plate 10 is immobilized, which results in immobilizing the screw 40.

The translation of the hopper 20 vis-à-vis the plate 10 enables the height h to be adjusted, which enables one to regulate the discharge of feed contained in the hopper 20 and which falls into the plate 10. When the height h is zero, the lower edge 25 of the hopper 20 is in contact with the base of the plate 10, so that the base of the hopper 20 is obstructed.

It is understood that the plate 10 can be considered as a trough to the extent that the level of feed which it can contain is adjustable.

A stopper 43, which has almost the same structure as plug 42, is fitted into the upper part of the screw 40.

A suspension element 50 passes inside the screw 40, the lower end of said suspension element being bent on itself in order to form a large part 51. This part 51 abuts against the end wall 42a of plug 42. Plug 42 comprises a radial slot (not shown) which enables the element 50 to be positioned in the plug 42 and part 51 against wall 42a.

The element 50 passes through a hole which is provided in the axis of plug 43 and has an upper end 53 which is fastened to the support 30.

It will be noted that a radial slot (not shown) is provided on the plug 43 to position element 50 or, on the other hand, to easily disengage it from said plug 43.

Thus, the entire unit, which consists of the receptacle 20 and the plate 10, is suspended by means of element 50 from support 30, at a height which depends on the length of the suspension element 50. Element 50 is advantageously flexible and it is, for example, made up of a metal rod having spring-like properties. It can, moreover, comprise a spiral part 52 which contributes to again giving this element 50 a greater flexibility.

The support 30 is designed to encircle a conveyor tube 60 of a feed distribution conveyor, under which the feeding device of the invention is installed. Inside the tube 60, a conveying element (not shown) is normally provided, such as a conveying screw which is designed to convey the feed from a silo to troughs. In order to be able to deposit the feed which it conveys into the feeding device of the invention, the tube 60 is provided with a aperture 61 in its lower part via which the feed to be distributed passes into the hopper 20 and plate 10.

In the embodiment shown, the support 30 consists of two parts 31 and 32, one of which 31 can pivot with respect to the other 32 about an axis 33 and interlock with respect to the other 32 by means of a catch 31a which engages in a corresponding groove 32a of part 32. When part 31 is closed on part 32, both enclose the tube 60 of the distribution conveyor. Means, such as legs of the tube 60 which engage in the slots of the support 30, can be provided to immobilize the support 30 on the tube 60 when parts 31 and 32 are closed together.

Support 30 is provided with an aperture 35 which, when the support 30 is in position on the tube 60, superimposes the aperture 61 of the tube 60 which allows the feed to fall out of the tube 60 into the hopper 20.

Two grooves 32f (only one is visible in FIG. 1), which are made up of slide bars for a trap (not shown) designed to seal the aperture 35, are provided in the lower part 32 of the support 30. When it is closed, this trap prevents the feed from pouring out of the tube 60 into the receptacle 20.

The support 30 also comprises an inclined slot 32b passing along the lower part 32 of the support 30 and a cavity 32d joined with the upper part of the slot 32b by a hole pierced into a wall 32e which separates the slot 32b from the cavity 32d. A pin 34 is fastened so as to cross the lower part of the slot 32b.

The upper part 53 of the suspension element 50 is bent so as to form an elbow 54 and be inclined vis-à-vis the vertical. This part 53 passes inside the slot 32b, between the base 32c of the slot 32b and the pin 34 and is rivetted in the base 32c of slot 32b. Thus, part 53 rests, on the one hand, on a first surface which consists of the pin 34 and which is situated inside the elbow 54 and, on the other hand, on a second surface which consists of the base 32c of the slot 32b and which is located on its end beyond said elbow 54 and outer side of said elbow 54.

The end 53 of the suspension element passes across the hole of wall 32e and leads into the cavity 32d where it has a hooked end. It will be noted that the suspension element 50 is bent at 54 so as to be able to pass along the base 32c of the slot 32b.

According to the invention, the entire unit formed by the hopper 20 and plate 10 is suspended, by means of the suspension element 50 and support 30, from the conveyor tube 60. This unit can be easily removed from the support 30. To accomplish this, the plug 42 must be disengaged from part 41 of screw 40, then made to pass element 50 in the radial slot of the plug 42 in order to disengage the element 50. Part 51 of element 50 slides inside the screw 40 and goes out via the end which usually receives the plug 43. The latter is previously removed.

It is thus possible to separate the unit formed by the receptacle 20 and plate 10 from the support 30 in order to be able to clean it.

Support 30 and tube 60, with their respective apertures 35 and 61, are shown in FIG. 2. The suspension element 50 is not shown, only pin 34. Support 30 is covered by a support element 70 which is completely open in its lower part 71. This part 71 comprises a flange 71a. In the lower part of element 70, a flexible tube 80 is mounted which elastically encloses the flange 71a. As a result, the flexible tube 80 acquires a curved shape. It serves as a guide for the feed when it passes out of the conveyor tube 60 toward the hopper 20.

In FIG. 3, a cap 90 is shown which is to be mounted, depending on the use and destination of the feeding device, either directly on the support element 70 to cover it, or on the flexible tube 80.

The cap 90 shown has a conical shape, the top of which is provided with a hole 91. The wall of cap 90 is provided with two holes 92 which face one another and are provided so as to allow the conveyor tube 60 to pass. Two slots 93 connect holes 92 to hole 91, respectively. At its top, cap 90 has raised edges 94 used to receive an elastic ring (not shown) which acts indirectly on the edges of holes 92 in order to firmly enclose the conveyor tube 60.

Two modes of application of a feeding device according to the first embodiment of the invention are schematically and respectively shown in FIGS. 4a and 4b.

As can be seen in the following, the mode of application shown in FIG. 4a is particularly suitable for feeding turkey hens and turkey cocks. The cap 90 covers the support element 70, as well as support 30. A space e is provided between the upper edge 24 of the receptacle 20 and the lower edge 95 of the cap 90, so that the animal can pass its neck through there. The length of the suspension element 50 is such that the unit formed by the plate 10 and receptacle 20 is above the ground (shown by hachures). The receptacle 20 has a lower edge 25 which rests totally in the base of the plate 10 which totally obstructs the lower opening of the receptacle 20. To accomplish this, the nut 22 is loosened up to the tube 14. The receptacle 20 is filled with feed to the desired level, relatively close to the upper edge 24.

To feed, the animal passes its head into the space e between the upper edge 24 of the receptacle 20 and lower edge 95 of cap 90, which it does by stretching the neck. Thus, it feeds in the central part of the receptacle 20 and consequently avoids overturning it on the litter. Due to the cap 90, it is unable to raise its head and again avoids overturning it on the litter.

It will be noted that the flange 24a smoothens the upper edge of the receptacle 20 and thus prevents the animal from injuring its wattle.

The mode of application shown in FIG. 4b is more suitable for chicks or young turkeys. In this embodiment, the plate 10 rests on the ground and the lower edge of the receptable 20 is several centimeters from the base of the plate 10. Thus, the feed pours into the plate 10 and, in particular, into the part between edge 12 and wall 21 of the receptacle 20.

The animal pecks in this part. Plate 10 and receptacle 20 are such that the wall 21 of the receptacle 20 is sufficiently close to the periphery 12 of the plate 10 that it constitutes an obstacle which prevents a chick from staying in the plate 10.

Cap 90 covers the receptacle 20 and is mounted on the collar formed by the tube 80, itself mounted on the support element 70, as is shown in FIG. 2. The support element 70 firmly encloses the conveyor tube 60.

In either mode of application, the cap 90 prevents the animal from perching on the feeding device, in particular due to its conical shape On which the animal does not have any hold.

It will be noted that, in the mode of application in FIG. 4a, when the animals bump or push the feeding device, in particular the cap 90 or the receptacle 20, the feeding device is not broken due to the flexibility of the suspension element 50, a flexibility which is enhanced by the use of a spiral part 52.

It can be seen in this embodiment that the plate 10 can be considered as a trough, even though the receptacle 20 only consists of a feed reserve.

A second embodiment of the invention is shown in FIG. 5. The elements which have the same function as in the first embodiment bear the same reference numbers with the addition of 100. Thus, the following can be seen: plate 110 is provided with a base 111 and a raised periphery 112, the receptacle 120, the support 130 for the feeding device on a conveyor tube 60 and the vertical suspension means 150.

This embodiment is a significant improvement over the feeding device of the first embodiment. In this embodiment, as can be seen in the following, the receptacle 120 is not just a simple hopper, as in the preceding embodiment, but a trough in the sense that it comprises means for controlling the amount of feed which it contains. With respect to plate 110, as in the first embodiment, it can also be considered as a trough. As will be seen in the following, the embodiment thus appears as two superimposed troughs which share the same feed tube 150.

In this embodiment, the receptacle 120 comprises a central part 122, not shown in section in FIG. 5 for the sake of clarity. The central part 122 is conically truncated and situated in the axis of the receptacle 120. It has a lateral wall 122a which is slightly flared toward the bottom. This central part 122 is provided, housed in its lateral wall 122a, with openings 122b, for example four, having relatively large dimensions, for example, occupying the entire half of the surface of the lateral wall 122a. In the embodiment shown, these openings have an almost rectangular section.

The central part 122 has a lower ridge which is joined to the base 123 of the receptacle 120, base 123 is also conically truncated and flared toward the bottom, but has a more significant slope than that of the central part 122. The base 123 is extended in its lower part by a horizontal part 124 in which apertures 124a are housed, occupying a significant surface of part 124, for example, half of the total surface of part 124. The apertures 124a enable the inside of receptacle 120 to be connected with the inside of plate 110.

A cover 125 is mounted in the inside part of the central part 122, the conical wall of said cover being more or less an upward extension of the wall of the base 123 of receptacle 120. The cover 125 is, for example, mounted by clips on the central part 122 and is required to facilitate removal, at the time of manufacture, of the receptacle 120.

In its upper part, the central part 122 is provided with a collar 126, shown in section and provided with a raised edge 126a. A crossbar 126b is also provided in this collar 126, the function of said crossbar being to enable the mounting of a flexible element (not shown), such as the suspension element 50 of the first embodiment, between the support 130 and receptacle 120. This assembly is optional and is not necessarily required for this embodiment.

The suspension element 150, as in the case of the first embodiment of the invention, is flexible so as to be able to absorb shocks to which the feeding device is subjected by the animals. In the embodiment shown in FIG. 5, it comprises a tube 150 of a pliable material, such as rubber, the lower end of which is mounted on the collar 126 of the receptacle 120 and fixed by means of a locking collar 151 and the upper end of which is mounted on the support 130 by means of a ring 152, the tube 150 being fixed on said ring 152 by a locking collar 153.

It will be noted that, to increase the rigidity of the suspension element 150, it is possible to double the elastic rods (not shown), respectively mounted on the generators of the wall of the tube 150 or on an elastic rod, the lower part of which is mounted on the crossbar 126b.

The raised edge 126a of collar 126 and the raised edge 152a of the ring 152 enable one to attain a better fixing of the tube 150 on the collar 127 and the ring 152.

It will be seen that, in FIG. 5, said pliable tube 150 is an extension of the lateral wall of the central part 122 of the receptacle 120.

It will be seen that the feed which is conveyed by the feed tube 67 is poured inside the support 130, then into the tube 150. There, it is poured into the space inside the central part 122 of the receptacle 120, passes through the windows 122b where it is conveyed toward the base 123 of the receptacle 120.

It will be noted that the space formed by the inside of the tube 150 and the inside of the central part 122 constitutes a feed reserve which can be poured into the receptacle 120 or into the plate 110. Thus, this is a joint reserve for two troughs, consisting of the receptacle 120 and plate 110 respectively.

About the central part 122 of the receptacle 120, a control element 200 is mounted which is in the form of a sleeve which assumes the general shape of the central part 122 and which comes to cover it, but at a certain distance therefrom, for example, in the order of several millimeters. The lateral wall of the element 200 is provided with holes 200a which are provided to receive a rod 151a projecting laterally on the locking ring 151.

This control element 200 allows one to regulate the amount of feed which is going to be deposited in the feed reserve formed inside the tube 150 and the central part 122 to a predetermined level in the receptacle 120, thus transforming the latter into a trough, as has already been explained.

Element 200 comprises a turned down raised edge 200b which follows the wall of the base 123 of the receptacle 120. The function of this raised edge 200b is to prevent the animals from picking at the feed source which consists of the above-mentioned reserve.

It will be noted that element 200 can also consist of a tube lodged inside the central part 122 and the lateral wall of which is adjacent to part 122. This tube is closed in its lower part and comprises, in its lateral wall, inclined windows. By turning this tube, the openings 122b of the central part 122 are more or less obstructed, thus regulating the amount of feed pouring through said openings 122b.

The trough consists of the receptacle 120 and the control element 200 is superimposed, as will be seen below, on a second trough consisting of, in particular, as in the first embodiment, the plate 110 which is movable vis-à-vis the receptacle 120.

From the base 123, going downward, there is a cylindrical part 127, the lower part of which ends in a raised edge 127a.

Plate 110 has a base 111 which is formed by a flat central part 113 and is slightly raised vis-à-vis the base 111. A hole 113a is pierced into this central part 113, the diameter of said hole being almost equal, with close play, to the outside diameter of the cylindrical part 127.

Plate 110 is mounted on the receptacle 120 in such a way that the cylindrical part 127 is housed in the hole 113a. Thus, plate 110 can slide axially in relation to the receptacle 120 and assume any position between a lower position and a high position defined below.

In a low position of the plate 110, shown on the right in FIG. 5, the receptacle 120 has a base 123 which is open onto the plate 110 by apertures 124a. On the other hand, in a high position of the plate 110, shown on the left in FIG. 5, the apertures 124a of base 124 of the receptacle 120 are obstructed by the central flat part 113 of the plate 110.

The level of feed in the plate 110 is linked to the relative height of the receptacle 120 above the plate 110. The result of this is that the plate 110 constitutes, also in this embodiment of the feeding device of the invention, a trough.

To maintain the relative position of the plate 110 and receptacle 120, locking means are provided which will now be described.

A series of protuberances 127b, separated by holes 127c which are pierced through in the lateral wall of the cylindrical part 127, are provided on a generator of the cylindrical part 127. A flap 160 is provided on the lower surface of the base 111, the pin 161 of which is designed to engage in one of the holes 127c of part 127. A control lever 162 is provided for sliding the pin 161 so that it can penetrate into one of the holes 127c.

When the pin 161 is situated in one of the holes 127, the plate 111 is immobilized vis-à-vis the receptacle 120. The protuberances 127b enable one to attain a notched sliding of the plate 111 relative to the receptacle 120.

One or more locking means, as will be described below, can be provided.

Due to the fact that the holes are pierced through in the wall 127, they cannot be obstructed by the feed, inserting the pin 161 into one of these holes pushes the accumulated feed out and clears them.

Support 130 is shown in detail in FIG. 6. It essentially consists of two half shells 131 and 132 having the general form of a parallelepiped. Two opposite lateral walls of each half shell have semi-cylindrical holes 131a and 132a emerging, which correspond to one another and which have a diameter close to that of the conveyor tube 60 of the installation. The half shells 131 and 132 can pivot relative to one another along an axis 133 which is parallel to the axis of holes 131a and 132a, but displaced downward vis-à-vis this axis.

It is noted that, when the two half shells 131 and 132 are closed, holes 131a and 132a of each wall form one single hole.

As can be seen, support 130, mounted on conveyor tube 60, functions in the following manner. It can assume two extreme positions: a closed position in which the semi-cylindrical holes of each half shell firmly enclose the tube 60 and an open position in which it is disengaged from the tube 60 from which it can be removed.

The two half shells 131 and 132 are respectively provided, in their lower parts below the pivot axis 133, with semi-cylindrical parts 131b and 132b which form, when the half shells 131 and 132 are closed, one single cylindrical part situated in an axis almost perpendicular to the axis of the holes 131a and 132a. The ring 152 is to be mounted on the cylindrical part formed by parts 131b and 132b. When this is the case and when the tube 150 is fixed and screwed on this ring 152 by means of the collar 153, due to the relative elasticity of the ring 152, the collar 153 also secures the lower part of the support 130, the result of which is that the support 130, by pinching on the tube 60, is firmly maintained on the conveyor tube 60.

Support 130 has a lower part which is open. In this respect, the absence of dots marking the thickness of the walls of the half shells 131 and 132 will be noted.

A cap 190, having a generally conical shape, is mounted on the trough of FIG. 5. On its top, it is provided with an axial hole 190a, having a diameter greater than the diameter of the suspension element 150, so that it can be slipped over it. Its lower part 190b is designed to rest on the upper part of the receptacle 120 so as to close it, namely, when the plate 110 is in its lower position, as is shown on the right in FIG. 5. On the other hand, when the plate 110 is in its lower position, the cap 190 is put on again in such a way that it leaves a space between the lower part of the cap 190 and the upper part of the receptacle 120.

It will be noted that, in certain applications, an extension 210 (shown by fine lines on the left in FIG. 5) is mounted on the receptacle 120, said extension having a generally conically truncated shape, the lateral wall of which is designed to slightly extend the lateral wall 121 of the receptacle 120. The extension 210 is, for example, fastened by rivets 211 on the wall of the receptacle 120. In particular, the extension 210 allows the capacity of the receptacle 120 to be increased.

A reinforcement 220 is provided which consists of a ring 221 which is housed in the peripheral raised edge 128 of the receptacle 120 and which is imprisoned by the extension 210. It again comprises a second ring 222 having a diameter which is close to that of the sleeve 200 from which arms 223 extend, the outside end of which is integral with the ring 221.

The reinforcement 220 is especially advantageous when an extension 210 is used. In fact, the animals can roughly hit against the outside wall of the extension 210, which, without the reinforcement 220, would result in a deformation of the receptacle 120, even break it. With the reinforcement 220, the stresses are transmitted, by the inside ring 222, to the collar 126 and the tube 150 then absorbs them by bending.

The modes of application of a feeding device according to the second embodiment of the invention are shown in FIGS. 7a and 7b. The plate 110, the receptacle 120, the support 130, the suspension element 150 and the control element 200 can be seen here.

The details of application are the same as those for the modes of application in FIGS. 4a and 4b.

As will be understood, in comparison with the modes of application depicted in FIGS. 4a and 4b, the mode of application shown in FIG. 7a is especially suitable for feeding turkey hens and turkey cocks, while the mode of application shown in FIG. 7b is suitable for chicks or young turkeys.

In the second embodiment, the feeding device of the invention appears as two superimposed troughs which share a common feed tube.

It will be understood that the feeding device of the invention is versatile and can be adapted to any type of poultry of various ages.

In this respect, it is noted that the feeding device of the second embodiment can be used as troughs, respectively formed by the receptacle 120 and the plate 110, each of which can function independently or simultaneously. By functioning simultaneously, the poultry can access the trough which is appropriate for them. They have the choice while growing up between the one or the other trough, the feed being available for a short period in the two troughs.

It is understood that the idea of the invention of the two superimposed troughs, as described in relation to the second embodiment, can be extended to any number of superimposed troughs. To accomplish this, a feeding device according to the invention comprises a plate, a receptacle or a plurality of superimposed receptacles, and means for connecting, as desired, said conveyor tube with the interior of each of said receptacles and with the inside of said plate, said receptacles and said plate comprising means for regulating the level of feed which they contain so as to function like a trough.

We claim:

1. A device for feeding animals, such as poultry, said device being adapted to be supplied with feed by a conveyor tube (60) from which it is suspended, said device comprising: a plate (10, 110), a receptacle (20, 120) communicating with said plate (10, 110), means for connecting said conveyor tube (60) with an inside area of said receptacle (20, 120), an outer periphery of said plate being in communication with said inside area of said receptacle so that said feed falls on said periphery, and means for regulating a level of feed on the outer periphery of said plate (10, 110) when it falls from the inside area of said receptacle (20, 120), both said plate (10, 110) and said receptacle (20, 120) having an open top so that both can function as feeding troughs to enable said animals to pick up feed therefrom.

2. A feeding device for animals according to claim 1, wherein said means for regulating the level of feed in said plate (10, 110) comprises at least one window (25, 124a) in a lower part (123, 124) of said receptacle (20, 120), said at least one window being opened onto a base (11, 111) portion of the plate (10, 110), said at least one window being obstructed by a sliding of said base portion (11, 111), said plate (10, 110) and said receptacle (20, 120) being able to slide axially in relation to one another so as to be able to assume any position between a window open position and a window closed position, the inside area of the receptacle (20, 120) communicating with the outer periphery of the plate (10, 110) where the feed is dispensed in all of the window opened and closed positions with the exception of the closed position.

3. A feeding device for animals according to claim 1 or 2, further comprising means for regulating the level of feed in said receptacle (120) when said receptacle (120) functions as a feeding trough.

4. A feeding device for animals according to claim 3, wherein said regulating means comprises a hollow central part (122) having a base (125) and an upper opening which is connected with said conveyor tube (60), a lateral wall (122a) of said central part (122) having at least one opening (122b) leading into said receptacle (120) and a control element (200) in the form of a sleeve which covers with play the central part (122) of the receptacle (120), and means for adjusting the height of said control element (200) relative to a lower end (123, 124) of the receptacle (120).

5. A feeding device according to claim 4, wherein an upper opening of the central part (122) is joined to the conveyor tube (60) by means of a pliable and flexible tube (150).

6. A feeding device according to claim 5, wherein said pliable tube (150) has a lower end which is mounted on a hollow support (130) that firmly surrounds the conveyor tube (60) and which has an open upper part, said support (130) comprising two half shells (131 and 132) which can pivot in relation to one another along an axis which is at least almost parallel to an axis of the conveyor tube (60), said pliable tube (150) being fitted into a part formed by said half shells (131 and 132) which are located below said pivot axis (133).

7. A feeding device according to claim 1, wherein said feeding device is suspended from the conveyor tube (60) by means of a flexible, pliable element (50, 150).

8. A feeding device according to claim 7, wherein said device is suspended from the conveyor tube (60) by a flexible, vertical suspension element (50) which is hooked, by its upper end, to said conveyor tube (60) and which is fastened, at its lower end, to one of said plate (10, 110) and said receptacle (20, 120).

9. A feeding device according to claim 8, wherein said flexible suspension element comprises a spiral part (52).

10. A feeding device according to claim 8 or 9, wherein said suspension element (50) passes into a tube (40), the lower end of said tube (40) being fastened in a base portion (11) of said plate (10) and the upper part of said tube 40 being connected to a wall (21) of the receptacle (20).

11. A feeding device according to claim 10, wherein said tube (40) is threaded, the receptacle (20) including a nut (22) positioned on its axis, said nut being joined to the wall (21) of the receptacle (20), and said nut having threads which may be screwed onto said threaded part (40) in order to axially displace said receptacle (20) relative to said plate (10).

12. A feeding device according to either one of the claims 8 or 9 further comprising a support (30) fixed to the conveyor tube (60), said support (30) comprising a suspension element (50), an upper part of said suspension element (50) being bent to be inclined in relation to the vertical, said bent part resting on a first surface (34) of said support inside an elbow (54) and on a second surface of said support (30) at its end beyond said elbow (54) and outer side of said elbow (54).

13. A feeding device according to claim 12, wherein the bent part is at an end of said suspension element (50), said bent part being a hook which is to be attached in a housing (32d) of said support (30).

14. A feeding device according to claim 1, further comprising a conical cap (90, 190).

15. A feeding device according to claim 1, wherein the plate (10, 110) and the receptacle (20, 120) are oriented so that a wall (21, 121) of the receptacle (20, 120) is close to the periphery (12, 112) of the plate (10, 110) so that said wall constitutes an obstacle which prevents a chick from staying in the plate (10, 110) and contaminating the feed.

16. A feeding device according to claim 1, wherein an upper edge of the receptacle (20, 120) has an extension (210) which extends a diameter of the upper receptacle edge (20, 120).

17. A feeding device according to claim 1, further comprising a reinforcement (220) having an outside circumferential ring (221) which is fixed to an upper edge of the receptacle (20, 120), said reinforcement (220) also comprising an inside ring (222) connected to the outside ring (221) by flared arms (223) for enabling the animals to push against edges of the receptacle (20, 120) at the lower part of the pliable receptacle (50, 150).

18. A feeding device according to claim 1, further comprising means for immobilizing the plate (10, 110) in relation to the receptacle (20, 120).

19. A feeding device according to claim 18, wherein said immobilization means comprises at least one flap (160) having a pin (161) which can penetrate into holes (127c) in a wall which is integral with the receptacle (20, 120).

20. A feeding device for animals, such as poultry, comprising means for supplying feed via a conveyor tube from which said device is suspended, said device further comprising a plate and a plurality of superimposed receptacles, said receptacles being open in part so that said animals can pick up feed therein, means for connecting said conveyor tube with an inside of said receptacles and inside of said plate, and said receptacles and said plate comprising means for controlling a level of feed which they contain, both said plate and said receptacles functioning as a feed trough.

* * * * *